United States Patent
Murphy

(10) Patent No.: US 10,876,682 B2
(45) Date of Patent: Dec. 29, 2020

(54) WALL MOUNTABLE SUPPORT

(71) Applicant: LOCK & LOAD SHELVING SYSTEMS PTY LTD, Hastings (AU)

(72) Inventor: Luke Anthony Murphy, Hastings (AU)

(73) Assignee: LOCK & LOAD SHELVING SYSTEMS PTY LTD

( * ) Notice: Subject to any disclaimer, the term of this patent is extended or adjusted under 35 U.S.C. 154(b) by 0 days.

(21) Appl. No.: 15/556,870

(22) PCT Filed: Mar. 5, 2016

(86) PCT No.: PCT/AU2016/050154
§ 371 (c)(1),
(2) Date: Sep. 8, 2017

(87) PCT Pub. No.: WO2016/141424
PCT Pub. Date: Sep. 15, 2016

(65) Prior Publication Data
US 2018/0238489 A1    Aug. 23, 2018

(30) Foreign Application Priority Data

Mar. 8, 2015 (AU) ................................ 2015900814
Mar. 12, 2015 (AU) ................................ 2015900882

(51) Int. Cl.
*A47B 96/00* (2006.01)
*F16M 13/02* (2006.01)
(Continued)

(52) U.S. Cl.
CPC ............. *F16M 13/02* (2013.01); *A47B 57/34* (2013.01); *A47B 96/067* (2013.01);
(Continued)

(58) Field of Classification Search
CPC ... A47F 5/0846; A47G 1/1686; A47G 1/1633; F16M 13/02; F16B 11/006; A47B 96/067; A47B 57/34; A47B 97/001
(Continued)

(56) References Cited

U.S. PATENT DOCUMENTS 3,268,195 A * 8/1966 Hoffman ............... A47G 1/1686
248/220.31
6,050,426 A * 4/2000 Leurdijk ............... A47B 96/067
211/57.1
(Continued)

FOREIGN PATENT DOCUMENTS

GB         2095979 A         10/1982

OTHER PUBLICATIONS

International Search Report dated Apr. 13 2016, for corresponding International Patent Application PCT/AU2016/050154 filed on Mar. 5, 2016.
(Continued)

*Primary Examiner* — Todd M Epps
(74) *Attorney, Agent, or Firm* — David D. Brush; Westman, Champlin & Koehler, P.A.

(57) ABSTRACT

The present invention provides a support for mounting in or on an upright member, the support comprising a first region and a second region, the first and second regions being separated by a bend in the support, the second region having item attachment region. The present support may be used to support an item such as a shelf, or to hang an item therefrom. The support of the present invention is configured so as to be insertable into a channel in an upright member (such as a wall) or into a receiving means that is in turn fixed to or inserted into an upright member. Also provided is a support system comprising a support as described herein, and a substantially upright member comprising a channel extend- (Continued)

ing thereinto, the channel angled into the member, the channel having an upper wall and a lower wall, optionally the upper wall having a recess disposed therein. The channel may be angled downwardly into the member.

19 Claims, 8 Drawing Sheets

(51) Int. Cl.
*A47B 57/34* (2006.01)
*A47G 1/16* (2006.01)
*A47G 25/06* (2006.01)
*A47B 97/00* (2006.01)
*A47B 96/06* (2006.01)
*A47F 5/08* (2006.01)
*A47G 1/17* (2006.01)
*A47G 1/20* (2006.01)
*F16B 11/00* (2006.01)
*F16B 45/00* (2006.01)

(52) U.S. Cl.
CPC .......... *A47B 97/001* (2013.01); *A47G 1/1633* (2013.01); *A47G 1/1686* (2013.01); *A47G 25/0607* (2013.01); *A47B 96/06* (2013.01); *A47F 5/0846* (2013.01); *A47G 1/17* (2013.01); *A47G 1/20* (2013.01); *F16B 11/006* (2013.01); *F16B 45/00* (2013.01)

(58) Field of Classification Search
USPC .......... 248/217.4, 218.1, 218.2, 222.51, 302, 248/303; 211/94.01, 87.01
See application file for complete search history.

(56) References Cited

U.S. PATENT DOCUMENTS

| 6,547,086 | B1* | 4/2003 | Harvey | A47F 5/0846 |
| | | | | 211/87.01 |
| 6,688,568 | B1 | 2/2004 | Moufflet | |
| 6,772,890 | B2* | 8/2004 | Campbell | A47F 5/0846 |
| | | | | 211/189 |
| 6,971,614 | B2* | 12/2005 | Fischer | A47F 5/0846 |
| | | | | 211/94.01 |
| 10,463,151 | B2* | 11/2019 | Murphy | A47B 96/066 |
| 10,670,064 | B2* | 6/2020 | Derelov | F16B 12/12 |
| 2003/0189019 | A1* | 10/2003 | Campbell | A47F 5/0846 |
| | | | | 211/94.01 |
| 2006/0091093 | A1* | 5/2006 | Armari | A47F 5/0846 |
| | | | | 211/94.01 |

OTHER PUBLICATIONS

Written Opinion of the International Searching Authority dated Apr. 13, 2016, for corresponding International Patent Application PCT/AU2016/050154 filed on Mar. 5, 2016.

* cited by examiner

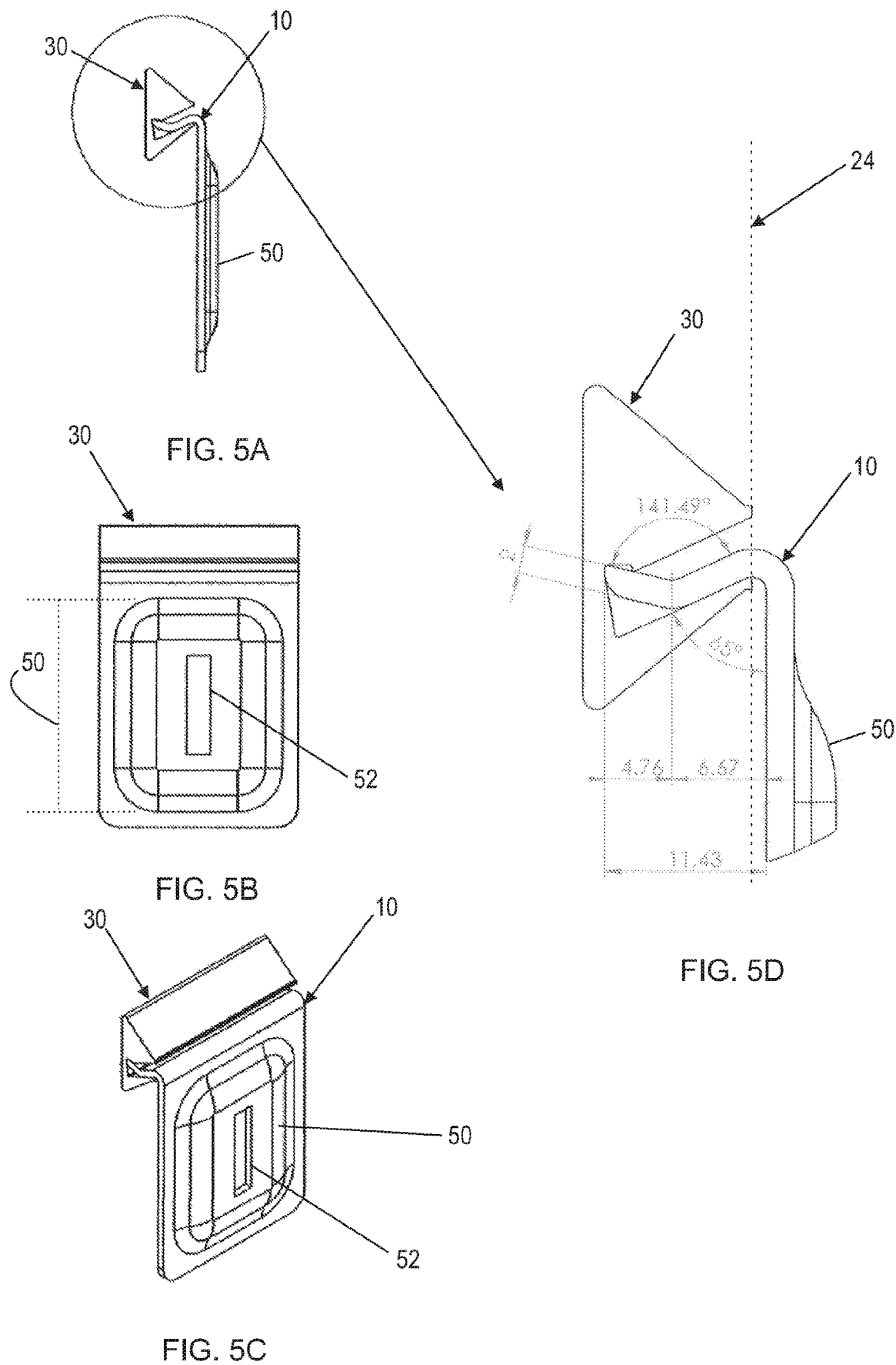

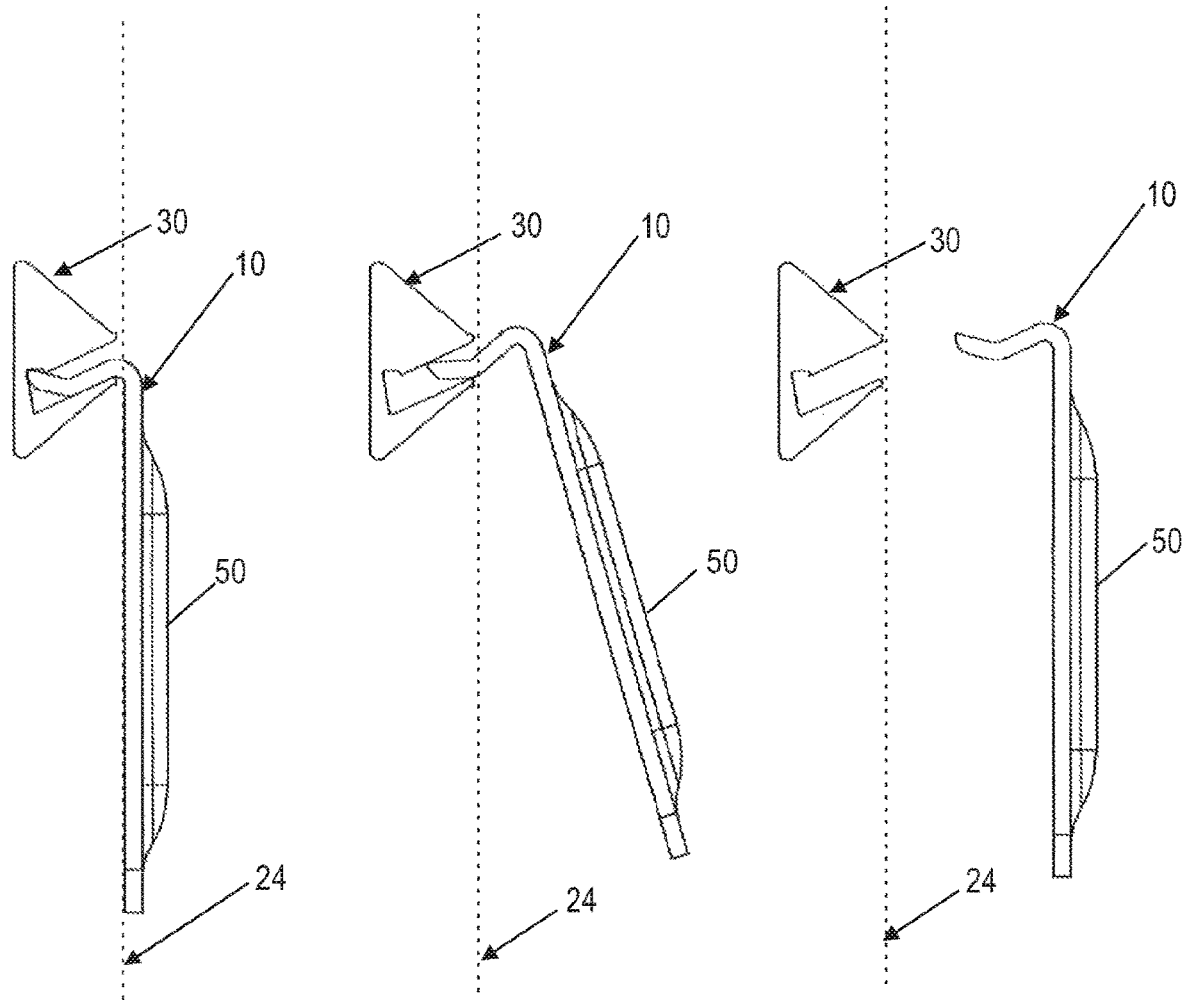

WALL MOUNTABLE SUPPORT

CROSS REFERENCE TO RELATED APPLICATION

The present application is a Section 371 National Stage Application of International Application No. PCT/AU2016/050154, filed Mar. 5, 2016, which is incorporated by reference in its entirety and published as WO 2016/141424 A1 on Sep. 15, 2016, in English.

TECHNICAL FIELD

This invention relates to the field of wall mountable supports, such as hooks, of the type useful in hanging items from a wall.

BACKGROUND

The prior art provides many types of supports attachable to an upright surface, such as a wall. Such supports may be used to hang various items therefrom, such as clothing, hardware, artwork, and the like. In other prior art embodiments the support is used to mount large items such as shelving onto a wall.

Many prior art support means rely on the use of fasteners, such as nails, screws, masonry anchors and the like to secure to the wall. A problem is that these types of support are not easily relocatable. The fastener must first be removed (often leaving damage to the wall, thereby requiring repair), and then further work expended in reinstalling the hook at the desired new location.

Other types of hook use removable adhesives which can be removed from a wall without damage. An example of this type of hook is provided in the Command™ system (3M Company, Minnesota). A problem of this hook type is that only very limited loads can be supported before the adhesive detaches from the wall. Furthermore, replacement adhesive is required to reinstall the hook at a new desired location.

For some types of support means, it is important that accidental dislodgement is minimised. Dislodgement can lead to any item supported by the support means falling to the ground and being damaged. Furthermore, a nearby person could be struck an injured by a falling item. Shelving in particular is prone to accidental demounting. For example, in a retail environment, a series of shelves may be mounted on a wall to display stock. A worker stocking a lower shelf may move from a bent position to an upright position and in the process strike the lower face of an upper shelf with his/her shoulder thereby demounting the shelf. The shelf itself may fall onto the worker, and indeed any heavy or sharp-edged stock retained on the shelf may fall causing potentially serious injury to the worker. It is often the case that shelving supports which have the advantage of being easily relocatable also suffer the disadvantage of being unsafe due to the easy by which accidental demounting may occur.

It is an aspect of the present invention to overcome or alleviate a problem of the prior art by providing an improved wall-mountable support, or simply an alternative to prior art supports. The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In a first aspect, but not necessarily the broadest aspect, the present invention provides a support for mounting in or on an upright member, the support comprising a first region and a second region, the first and second regions being separated by a bend in the support, the first region having a recess engaging region, and the second region having an item attachment region.

In one embodiment the engaging region has an upper face.

In one embodiment the engaging region has an engaging member extending from the upper face.

In one embodiment, when mounted on an upright member, the item attachment region extends downwardly and substantially vertically.

In one embodiment, at least part of the item attachment region is substantially linear.

In one embodiment, when mounted on an upright member, the substantially linear part of the item attachment region is substantially vertical.

In one embodiment, when mounted on an upright member, the item attachment region extends downwardly and substantially vertically for a distance of at least around 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, or 100 mm. The distance may be measured along the substantially linear part of the item attachment region.

In one embodiment, the item attachment region is configured to allow for the direct or indirect engagement of the item therewith.

In one embodiment, the engagement is a hanging engagement, or a support engagement.

In one embodiment, the item attachment region is, or comprises, a member extending in a direction generally opposite to the direction along which the first region extends.

In one embodiment, the item attachment region is, or comprises, a hook, a prong, a protuberance, a barb, an adhesive region, a frictional engagement region, a deformation, an aperture, a slot, or a recess.

In one embodiment, the second region and the item attachment region are separated by a bend.

In one embodiment, the bend separating the first and second regions is in the opposite direction to the bend separating the second region and the item attachment region.

In one embodiment, the angle of the bend separating the first and second regions is greater than the angle of the bend separating the second region and the item attachment region.

In one embodiment, the angle of the bend separating the first and second regions is at least about double the angle of the bend separating the second region and the item attachment region.

In a second aspect, the present invention provides a support system comprising: the support as described herein, and a substantially upright member comprising a channel extending thereinto, the channel angled downwardly into the member, the channel having an upper wall and a lower wall.

In one embodiment of the second aspect the upper wall has a recess disposed therein.

In one embodiment of the second aspect the channel of the upright member and the support are configured such that the recess engaging region of the support is insertable into the channel, and when inserted into the channel the support is pivotable on a pivot point of the channel such that the recess engaging region is moveable into the recess of the channel thereby locking the channel and support together.

In one embodiment of the second aspect, the pivot point of the channel is the edge of the lower wall of the channel at the open end of the channel.

In one embodiment of the second aspect, the support pivots in response to a downward force applied on the item attachment region of the support.

In one embodiment of the second aspect, the recess is disposed at or toward the blind end of the channel.

In one embodiment of the second aspect, channel is formed separately to the upright member, and is fitted to or incorporated into the upright member.

In one embodiment of the second aspect, the upright member is a panel, or a board or a wall.

In a third aspect, the present invention provides a method for inserting a support into an upright member, the method comprising the steps of: providing the support as described herein, and inserting the support into the substantially upright member as described herein.

BRIEF DESCRIPTION OF THE DRAWINGS

Linear measurements are in millimetres.

FIG. 5A is a cross-sectional diagram of a support configured to receive an outwardly extending member, the support inserted into a channel.

FIG. 5B is a diagrammatic face-on view of the support/channel shown in FIG. 5A.

FIG. 5C is a diagrammatic perspective view of the support/channel shown in FIG. 5A.

FIG. 5D is a more detailed view of the circled portion of the support/channel shown in FIG. 5A. Linear measurements are in millimetres.

FIGS. 6A, 6B and 6C are diagrammatic side views show the sequential steps in removal of the support from the channel of the support/channel shown in FIG. 5A.

DETAILED DESCRIPTION OF THE INVENTION AND PREFERRED EMBODIMENTS

Figure 1A:
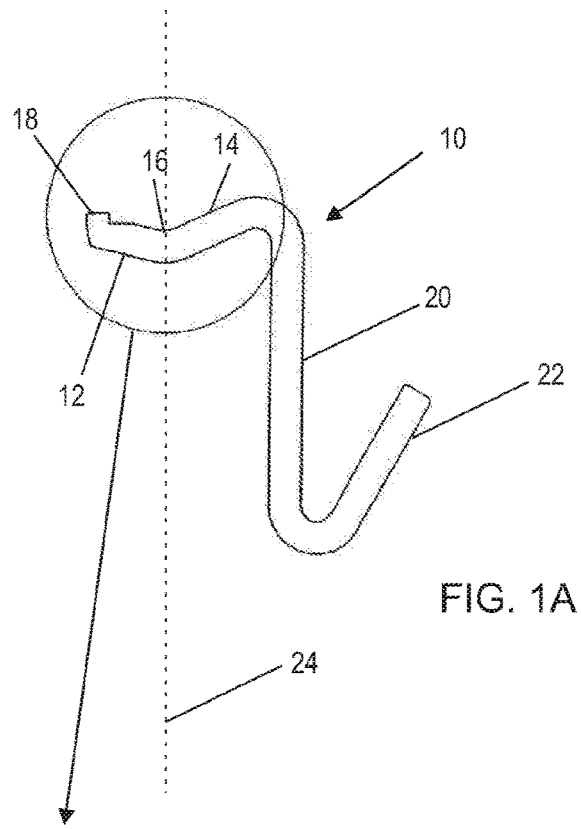
FIG. 1A is a cross-sectional diagram of a preferred support of the present invention. The support may be inserted into an upright member, such as a wall having an appropriate channel to provide a wall-mounted hook for hanging an item thereon.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

In a first aspect the present invention provides a support for mounting in or on an upright member, the support comprising a first region and a second region, the first and second regions being separated by a bend in the support, the second region having item attachment region.

As used herein, the term "support" as used to describe an article of the present invention is intended to mean a contrivance from which an item may be hung from, or supported by. The term "support" is not intended to be read in a limited manner to exclude contrivances capable only of hanging an item therefrom.

The support of the present invention is configured so as to be insertable into a channel in an upright member (such as a wall) or into a receiving means that is in turn fixed to or inserted into an upright member.

The support comprises first and second regions, wherein when inserted into a channel the first region is disposed within the channel and the second region remains outside the channel. The first region is configured so as to engage in a manner with the channel while the second region (either directly or indirectly) is configured to act as a means by which an item is hung from or supported by.

When inserted into a suitable channel disposed in a wall (for example) any portion of the support which is external to the channel may be used to hang or support an item. In particular, household items that are normally supported or hung from a wall (either indoor or outdoor) may be hung or supported with a present support of the present invention.

The support may be configured so as to support an item of weight of at least 100 g, 200 g, 300 g, 400 g, 500 g, 600 g, 700 g, 800 g, 900 g, 1 kg, 1.5 kg, 2 kg, 2.5 kg, 3 kg, 3.5 kg, 4 kg, 4.5 kg, 5 kg, 6 kg, 7 kg, 8 kg, 9 kg, 10 kg, 15 kg, 20 kg, 25 kg, 30 kg, 35 kg, 40 kg or 50 kg.

The support may be fabricated by rolling, forming, casting, forging, moulding or any such suitable means, and from any suitably deformation-resistant material such as a metal (including ferrous, and non-ferrous materials such as aluminium, brass or nickel), or a suitable plastic such as a high density polyethylene or polypropylene.

Figure 3A:
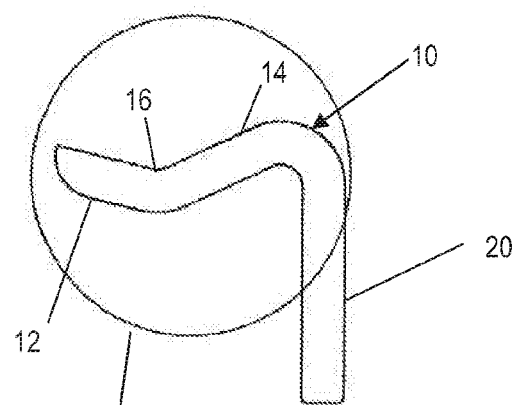
FIG. 3A is a cross-sectional diagram of another preferred support of the present invention. This support is similar to that shown in FIGS. 1A and 1B except for: (i) the absence of an engaging member on the upper face of the first region, and (ii) the absence of a hook-like formation.
Figure 3B:
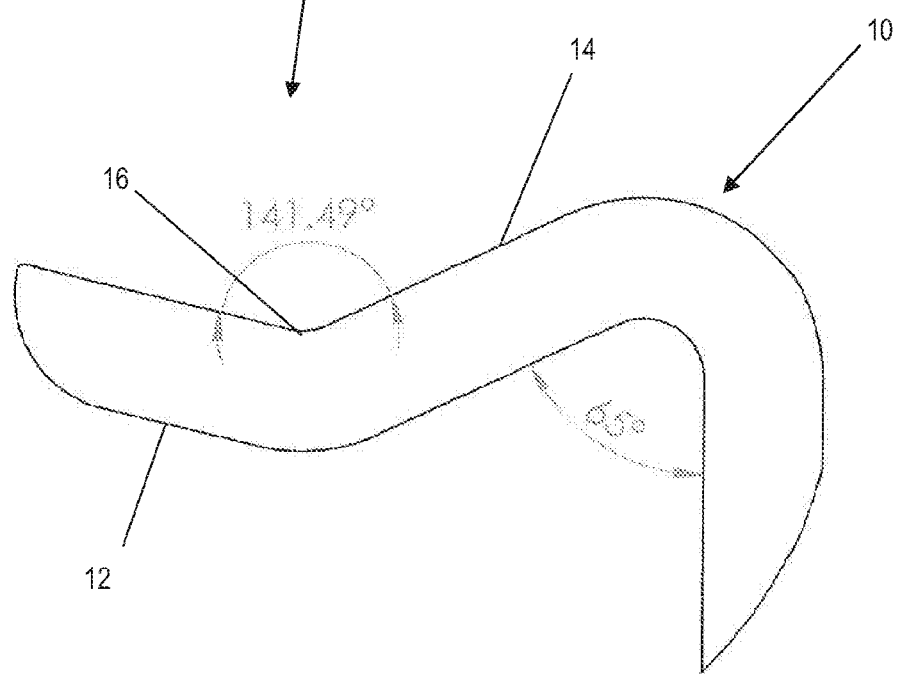
FIG. 3B is a more detailed view of the circled portion of the support shown in FIG. 1.
Figure 3C:
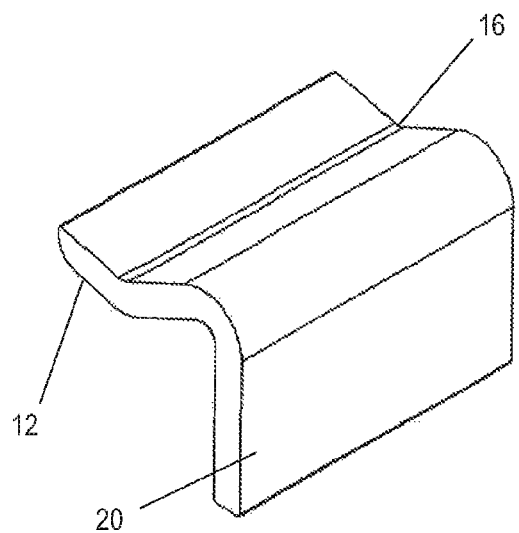
FIG. 3C is a perspective view of the support of FIG. 3A.
Figure 3D:
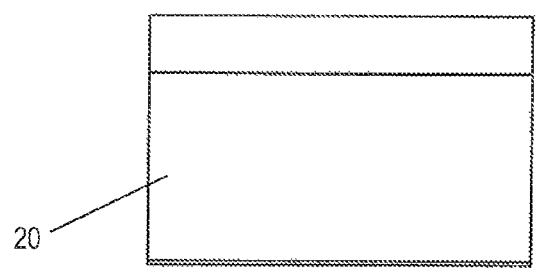
FIG. 3D is a face-on view of the support of FIG. 3C, the view taken toward the face marked 20.

The support may be relatively wide in configuration (as shown in FIGS. 3C and 3D), or in other embodiments may be more narrow. It will be understood that wider configurations are capable of spreading load across the support and will therefore be more suitable for application where the weight of an item to be hung or supported is relatively high.

The width of the support may be at least about, or less than about: 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, or 20 cm.

In some embodiments, the support is only as wide as it is thick, such embodiments being useful for hanging or supporting relatively light weight items typically of less than 1 kg.

It will be appreciated that the support may be configured to carry a partial load where two or more supports are used to support or hang a single item.

The support may have an upper face on the first region. The upper face may be substantially planar but in some embodiments is curved. In some embodiments the upper face (or at least part thereof) frictionally engages into a channel into which it is inserted to as to prevent or limit movement of the support within the channel thereby preventing the support from being pulled from the channel.

An engaging member may extend from the upper face. Where present, the function of the engaging member is to insert into and remain within a recess in a channel formed within an upright member (such as a wall) into which the support is inserted. The engaging member is typically a protuberance extending from the first region, but may simply be a deformation of the first region.

In some embodiments, the engaging member may be formed by a bend in the first region to form an end region (exemplary embodiments shown in FIGS. 3 to 7). In such embodiments, the terminus of the end region may have a curved profile so as to facilitate rotation of the end region out of the channel wall recess as shown in FIG. 6.

The function of the second region is to act as an item attachment region, or to prove an attachment for an item attachment region. For example, the second region may be substantially elongate and terminate in a hook-shape thereby acting an item attachment region per se. Alternatively, the second region may have may no inherent means for attaching an item, and may be used as an attachment point for a separate hook, prong, barb, clip, or any other means for attaching an item.

When mounted on an upright member, the item attachment region may extend downwardly and substantially vertically. In this way, the load applied by the item to the support may be disposed lower than the first region. The distance may be at least around 5 mm, 6 mm, 7 mm, 8 mm, 9 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, or 100 mm The item attachment region may extend downwardly, and at least for a distance that provides sufficient area for an item to attach, or for a separate item attachment means (such as a hook) to attach.

Preferably, item attachment region is substantially linear and may extend downwardly parallel with a surface of the upright member. In this way, the item attachment region may rest against the upright member surface, or alternatively may be equidistantly spaced from the upright member surface for its length.

The first and second regions may be separated by a bend, the bend typically in the downwards direction so as to form a shallow V-shape. The bend is generally positioned or otherwise configured so as to bear against a lower wall of a channel into which the support is inserted. In some embodiments, the bend acts as a pivot, allowing the support to rock to a minor extent when disposed within a channel. This minor rocking motion allows for movement of the first region upwardly in response to a downward load being placed on the item attachment region.

The upward movement causes (i) the upper face of the first region to frictionally engage with upper wall of the channel and/or (ii) the engaging member (where present) to move into a recess in the upper wall of the channel.

In one embodiment, the support comprises a second bend separating the second region and the item attachment region. Typically, the bend separating the first and second regions is in the opposite direction to the bend separating the second region and the item attachment region. This second bend is required in some embodiments to allow for the item attachment region to extend below the first region, thereby allowing any load to be applied below the bend between the first and second regions.

In a further aspect the present invention provides a support system comprising a support as described herein, and a substantially upright member comprising a channel extending thereinto, the channel angled into the member, the channel having an upper wall and a lower wall, optionally the upper wall having a recess disposed therein. In one embodiment, the channel is angled downwardly into the member.

In one embodiment, the upper and lower walls are substantially planar, or have regions that are substantially planar. Such regions may run substantially parallel to each other. Where the upper wall of the channel has a recess, the recess may be at or toward a blind end of the channel.

In one embodiment, the lower wall at the open end of the channel is configured to form a pivot point, so as to allow a support disposed therein to pivot.

The channel may be formed integrally with the upright member, however more typically the channel is fabricated in the form of a receiving means with the receiving means being fitted to (and preferably inserted into) the upright member. When inserted into the upright member, the opening of the channel is presented at the surface of the upright member.

The channel is generally fabricated from a deformation resistant material so as to provide a firm and stable platform to support the support when inserted. The channel may be fabricated from the same or similar material as for the support as discussed supra.

The upright member may be a panel, or a board or a wall, or any other structure to which an item might be supported by or hung from.

Turning now to FIG. 1A there is shown a support 10 configured to be inserted into a channel (not shown) presented at the vertical face of the upright member (not shown). The support 10 is fabricated from rolled metal, and comprises a first region 12 and a second region 14, the two regions demarcated by a bend 16. The first region 10 comprises an engaging member 18 on the upper face. The support 10 further comprises an item attaching region being a vertically downwardly extending member 20 in this embodiment, which is bent upwardly to form an outwardly extending hook terminus 22. It will be noted that the so-formed hook is capable of receiving an item to be hung on a wall. For orientation, the external surface of the wall 24 is shown. It will be noted that the downwardly extending member 20 runs vertically and parallel to the wall surface 24 for some distance.

Figure 1B:
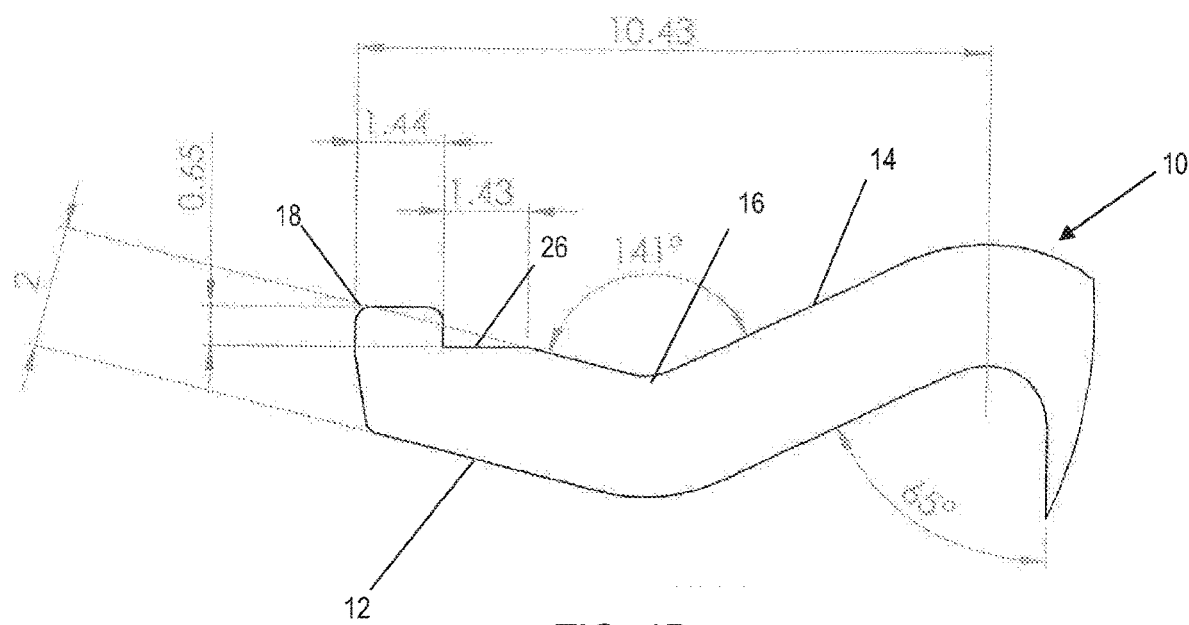
FIG. 1B is a more detailed view of the circled portion of the support shown in FIG. 1.

FIG. 1B shows greater detail of the first 12 and second 14 regions, and also the engaging member 18. Also more clearly shown is the planar region 26 which abuts the engaging member 18.

The dimensions (in centimetres) and angles superimposed on the support of FIG. 1B are exemplary only, and should be taken to be restrictive in any way. These exemplary dimensions and angles are useful for an insert which is matched to a receiving means configured for use with a board of about 18 mm thickness, having the dimensions and angles as recited supra. It will be appreciated that a board of different thickness may be used, in which dimensions and/or angles recited supra in respect of the insert may be modified In other embodiments, the dimensions or angles may fall with a range (plus or minus) of about 1%, 2%, 3%, 4%, 5%, 6%, 7%, 8%, 9%, 10%, 15%, 20%, 25%, 30%, 35%, 40%, 45%, 50%, 60%, 70%, 80%, 90%, or 100% of the values presented in FIG. 1B Turning to FIG. 2 there is shown the support 10 of FIG. 1 inserted into a receiving means 30 having a channel 32. The receiving means 30 is shown inserted into a wall 24 to provide an anchorage point for the support. The receiving means has a channel 32 having an upper wall 34 and a lower wall 36. At the blind end of the channel 32 is a recess 38 disposed in the upper wall 34.

The receiving means 30 provides a pivot point 39 at the edge of the lower wall 36 of the channel 32. The function of the pivot point 39 is to allow for a slight rocking of a support inserted into the channel 32.

The receiving means 30 provides an abutment point in the form of the rear wall 37 of the channel 12. The function of the abutment point at 37 is to ensure that the engaging means 18 is disposed immediately under the recess 38, such that when the support 10 pivots on the point 39 the engaging means is moved into the recess 38.

It will be appreciated that the engaging means may not be at the terminus of the support 10, and may be located at any point on the upper face of the first region. However, a greater upward force will be applied to the engaging member if it is disposed at the terminus this providing for more secure retention of the insert.

The receiving means 30 is shown in the orientation in which it is typically used.

As will be appreciated, the dimensions and angles of the various components of the receiving means 30 will be dictated by the dimensions and angles of the various interacting components of the support 10.

Turning to FIG. 3, there is shown an alternative embodiment of the support means that is devoid of the engaging means on the upper face of the first region. This embodiment of the support means 10 comprises a similar arrangement as the embodiment in FIG. 1 in so far as a first region 12, second region 14 with a demarcating bend 16 is provided. Furthermore, a downwardly extending member 20 is included, having the same function as that for the same structure as for the embodiment of FIG. 1, being an item attachment means.

In the embodiment of FIG. 3, the member 20 does not form a hooked structure. Instead, the member provides an area on which a hook, adhesive or similar may be attached. Alternatively, the member 20 may be modified to have a notch, the notch capable of hanging a textile item, for example.

The embodiment of FIG. 3 does not comprise an engaging member, and accordingly a channel into which it inserts may or may not comprise a recess for accepting an engaging member.

Figure 4:
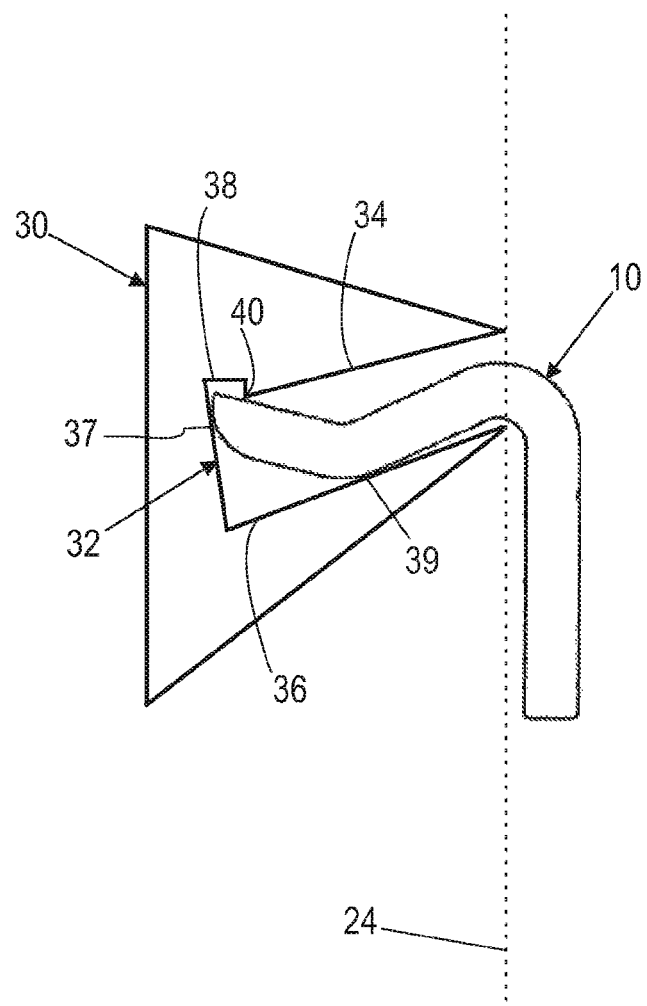
FIG. 4 is a cross-sectional diagram of the support of FIG. 3 when inserted into a channel in a wall.

FIG. 4 shows the support means of FIG. 3 inserted into a channel 32. The channel in this embodiment has a recess 38, which accommodates the terminus of the support 10. The upper face of the first region of the support 10 bears against the corner 40 formed by the recess 38 and upper channel wall 34. In this embodiment, the support and/or channel is configured so as to allow minor rocking of support means 10 on the pivot point 39. In any event, the support is retained in position by one or both of:

(i) the weight of an item hung from or supported by the support, in turn causing an upward movement of the upper face of the first region of the support so as to bear against the corner 40 (the upward movement of the first region being the result of pivoting of the support on the point 39 of the receiving means), (ii) the weight of an item hung from or supported by the support, in turn causing the support to bear downwardly on the obtuse corner of the insert on the point 39 of the receiving means, It will be appreciated that the greater the load placed on the support by the item, results in a greater upward force being applied to the first region 12 of the support, and in turn an increased force of (i) the engaging member 18 against the recess 38 to further increase the resistance against the insert 10 being pulled out of the channel 36, or (ii) the upper face of the first region 12 of the support against the corner 40.

The angles superimposed on the support of FIG. 3B are exemplary only, and should be taken to be restrictive in any way. The angles may fall with a range (plus or minus) of about 1%, 2%, 3%, 4%, 5%, 6%, 7%, 8%, 9%, 10%, 15%, 20%, 25%, 30%, 35%, 40%, 45%, 50%, 60%, 70%, 80%, 90%, or 100% of the values presented in FIG. 3B.

In the Figures, the support 10 is shown in the orientation in which it is intended to be used, i.e. when inserted into a receiving means disposed in a wall or other upright member. In this orientation, the first region 12 extends upwardly into the distal region of the channel presented by the receiving means, and the second region 14 extends toward the vertical face of the upright member, the lower face of the second region making an acute angle with the wall.

The support 10 is typically configured so as to insertable into the channel only up to a certain point. This may be achieved by the use of a stop member extending from the support, positioned to collide with the channel edge. Alternatively, the support is configured so as to be stopped by the end wall 37 of the channel 32.

The item attaching region may be configured so as to extend substantially at 90 degrees to an upright member into which the support is inserted. In this embodiment, a horizontal shelf (for example) may be attached to the item attachment region, and thereby retained in position horizontal to the upright member. In such embodiments, a shelf may be supported by two or more or more supports. The retaining means may run horizontally across the upright member and for the length of the shelf. The retaining means may therefore be of substantial length, and may be pushed lengthwise into an elongate recess routed into the upright member so as to provide a channel running horizontally across the upright member. In this way, a support may be inserted at any point(s) across the upright member.

Figure 2:
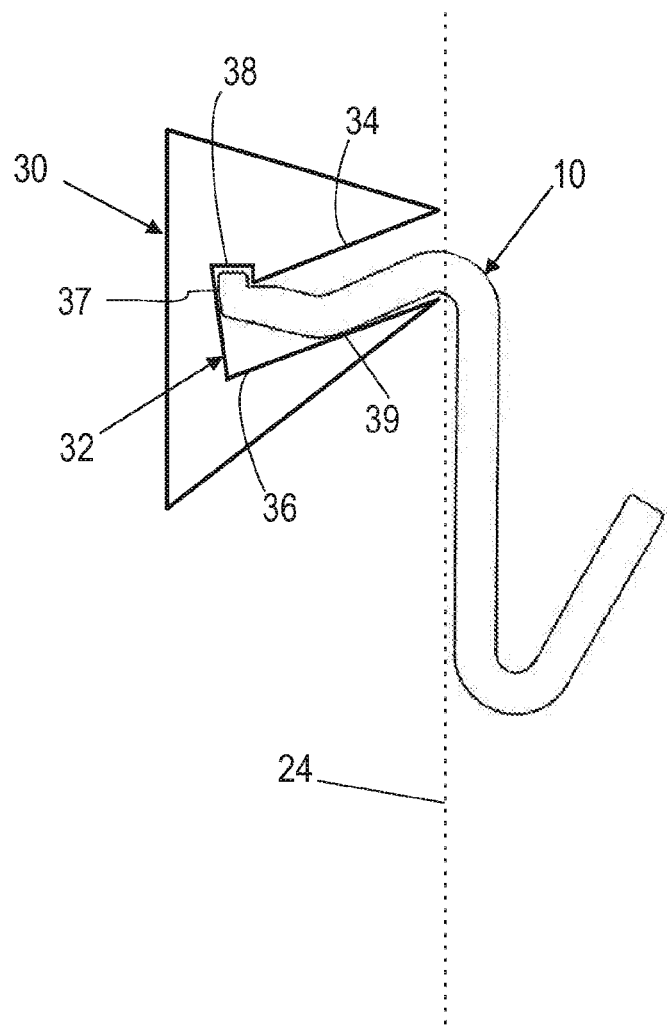
FIG. 2 is a cross-sectional diagram of the support of FIG. 1 when inserted into a channel in a wall.

The item attaching region may be configured in some embodiments to extend upwardly (i.e. in a direction generally opposite to that shown in FIGS. 2, 4 and 5).

In some embodiments, the item attaching region is configured so as to carry an outwardly extending member. The member extends outwardly with reference to an upright member (wall) with which the support is engaged. Where the member is elongate, the longitudinal axis of the member may extend orthogonal to the wall, or at an angle thereto.

While the outwardly extending member may be formed integrally with the item attaching region, for ease of manufacture at least the item attaching region may be configured to receive an outwardly extending member, as shown in FIGS. 5A to 5D. In that exemplary embodiment the outwardly facing surface of the item attaching region is formed into a raised portion 50, with a slot 52 formed therein. It will be appreciated the slot may be any aperture, depression or other means capable of facilitating the attachment of a member. The raised nature allows a portion of a member to extending into the support, with the portion prevented from contacting an underlying wall. The portion extending into the support facilitates attachment of the outwardly extending member to the support. For example, the portion may be welded onto the back face of the item attachment portion of the support.

Reference is now made to FIGS. 6A to 6C which shows sequentially the removal of the support of FIG. 5A from the channel. It will be noted that removal of the support is only possible by firstly rotating the support away from the wall so as to cause the terminal portion (engaging means) of the support to retract from the recess in the upper wall of the channel. Secondly, once the recess is cleared removal is achieved by pulling the support upwardly and outwardly along the path described by the downwardly extending channel. The need to manipulate the support precisely and sequentially in order to remove the support significantly decreases the likelihood of a person knocking and accidentally demounting the support (and any item attached thereto) from the channel. For example, where the support is used to mount a shelf from a wall, a person knocking the shelf from underneath will very unlikely result in the required rotation of the support and the required upward an outward movement of the support required to effect complete demounting.

Figure 7A:
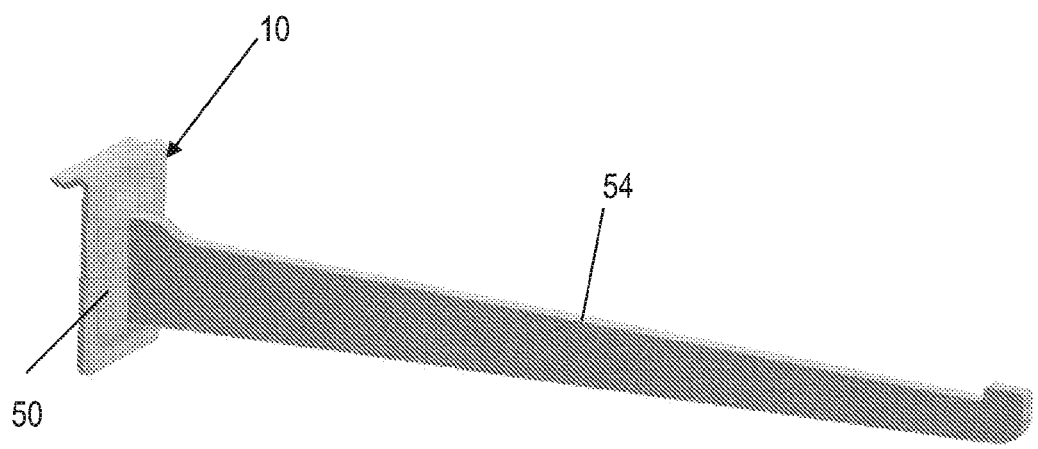
FIG. 7A is a perspective diagram of the support shown in FIG. 5A having a shelf support extending therefrom.

FIG. 7A shows the support of FIG. 5A, with a shelf support member 54 welded into the slot (not shown) formed in the raised area 50.

Figure 7B:
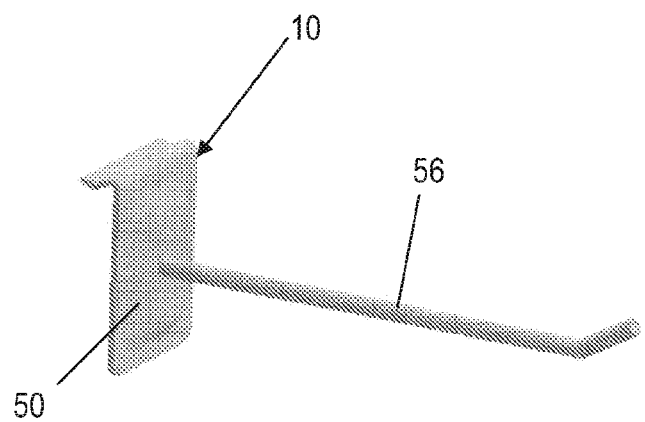
FIG. 7B is a perspective diagram of a support similar to that shown in FIG. 5A having a bar extending therefrom.

FIG. 7B shows a variation on the embodiment of FIG. 7A. An aperture of circular cross-section (not shown) is formed in the raised portion 50, the aperture sized to accept the bar 56. The bar 56 may be used, for example, to hang clothing or a coat hanger therefrom.

Irrespective of the direction in which the item attaching region extends, a downward force provided by an item disposed thereon nevertheless causes minor rocking of the support within the channel so as to provide engagement between the support and channel.

Furthermore, the angled external faces of the receiving means (i.e. the faces adjacent the upper and lower channel walls) form a wedge-like arrangement so as to prevent the receiving means being pulled from the upright member when significant load is applied by a heavy item.

It will be understood that embodiments of the invention directed to a discrete receiving means that is inserted into any existing upright member are preferred only. Other receiving means may be attached to an outer surface of the upright member, or indeed formed integrally with the upright member.

It will be understood that the actual materials, dimensions and angles of the receiving or the support may be alterable according to the practical application of the invention. For example, where the invention relates to a system designed to carry significant weight materials of greater strength may be used, or overall dimensions of the receiving means may be increased as required. Such alteration is will within the ability of the skilled artisan using only routine means.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Steps may be added or deleted to methods described within the scope of the present invention.

Although the invention has been described with reference to specific examples, it will be appreciated by those skilled in the art that the invention may be embodied in many other forms.

The invention claimed is:

1. A support for mounting in or on an upright member, the support being fabricated from a deformation-resistant material, the support comprising:
   a first region and a second region, the first and second regions being separated by a first bend in the support, the first region having a recess engaging region adjacent to the first bend in the support,
   the second region having a connecting region and an item attachment region, which are separated by a second bend in the support, the connecting region extending between the first and second bends, and the item attachment region being adjacent to the second bend, and
   wherein when a long axis of the item attachment region is oriented substantially vertically, and recess engaging region has a highest point and most or all of the recess engaging region is below a highest point of the support at the second bend.

2. The support of claim 1 wherein the engaging region has an upper face.

3. The support of claim 2 wherein the engaging region has an engaging member extending from the upper face.

4. The support of claim 1 wherein, when mounted on an upright member, the item attachment region extends downwardly and substantially vertically.

5. The support of claim 1 wherein at least part of the item attachment region is substantially linear.

6. The support of claim 5 wherein when mounted on an upright member, the substantially linear part of the item attachment region is substantially vertical.

7. The support of claim 1 wherein the item attachment region is, or comprises, a member extending in a direction generally opposite to a direction along which the first region extends.

8. The support of claim 1 wherein the item attachment region is, or comprises, a hook, a prong, a protuberance, a barb, an adhesive region, a frictional engagement region, a deformation, an aperture, a slot, or a recess.

9. The support of claim 1 wherein the first bend is in an opposite direction to the second bend.

10. The support of claim 9 wherein an angle of the first bend is greater than an angle of the second bend.

11. The support of claim 10 wherein the angle of the first bend is at least double the angle of the second bend.

12. The support of claim 1, wherein the item attachment region comprises a raised portion with an aperture formed therein configured to allow attachment of an outwardly extending member to the item attachment region such that a portion of the outwardly extending member extends through the aperture and into the raised portion.

13. A support system comprising:
   a support fabricated from a deformation resistant material, the support comprising:
      a first region and a second region, the first and second regions being separated by a first bend in the support,
      the first region having a recess engaging region adjacent to the first bend in the support,
      the second region having a connecting region and an item attachment region, which are separated by a second bend in the support, the connecting region extending between the first and second bends, and the item attachment region being adjacent to the second bend, and
      wherein when a long axis of the item attachment region is oriented substantially vertically, and the recess engaging region has a highest point and most or all of the recess engaging region is below a highest point of the support at the second bend; and
   a substantially upright member comprising a channel extending thereinto, the channel angled downwardly into the member, the channel having an upper wall and a lower wall, the support being configured to mount in or on the upright member.

14. The support system of claim 13 wherein the upper wall has a recess disposed therein.

15. The support system of claim 13 wherein the channel of the upright member and the support are configured such that the recess engaging region of the support is insertable into the channel, and when inserted into the channel the support is pivotable on a pivot point of the channel such that the recess engaging region is moveable into the recess of the channel thereby locking the channel and support together.

16. The support system of claim 13 wherein the channel has an open end and the pivot point of the channel is the edge of the lower wall of the channel at the open end of the channel.

17. The support system of claim 13 wherein the support pivots in response to a downward force applied on the item attachment region of the support.

18. The support system of claim 13 wherein the recess is disposed at or toward a blind end of the channel.

19. A method for inserting a support into an upright member, the method comprising the steps of:
   providing a support the support being fabricated from a deformation-resistant material, the support comprising:
      a first region and a second region, the first and second regions being separated by a first bend in the support,
      the first region having a recess engaging region adjacent to the first bend in the support,
      the second region having a connecting region and an item attachment region, which are separated by a second bend in the support, the connecting region extending between the first and second bends, and the item attachment region being adjacent to the second bend, and
      wherein when a long axis of the item attachment region is oriented substantially vertically, and the recess engaging region has a highest point and most or all of the recess engaging region is below the highest point of the support at the second bend; and
   inserting the support into a substantially upright member comprising a channel extending thereinto, the channel angled downwardly into the member, the channel having an upper wall and a lower wall.

* * * * *